United States Patent [19]

Yamada et al.

[11] Patent Number: 4,979,212
[45] Date of Patent: Dec. 18, 1990

[54] SPEECH RECOGNITION SYSTEM IN WHICH VOICED INTERVALS ARE BROKEN INTO SEGMENTS THAT MAY HAVE UNEQUAL DURATIONS

[75] Inventors: Youichi Yamada; Keiko Takahashi, both of Tokyo, Japan

[73] Assignee: OKI Electric Industry Co., Ltd., Tokyo, Japan

[21] Appl. No.: 425,376

[22] Filed: Oct. 20, 1989

Related U.S. Application Data

[63] Continuation of Ser. No. 84,108, Aug. 11, 1987, abandoned.

[30] Foreign Application Priority Data

Aug. 21, 1986 [JP] Japan .................. 61-196269

[51] Int. Cl.$^5$ .......................... G10L 7/08; G10L 9/06
[52] U.S. Cl. ........................................ 381/45; 381/41
[58] Field of Search .................. 364/513.5; 381/41–50

[56] References Cited

U.S. PATENT DOCUMENTS

| | | | |
|---|---|---|---|
| 3,582,559 | 6/1971 | Hitchcock | 381/43 |
| 4,481,593 | 11/1984 | Bahler | 364/513.5 |
| 4,696,042 | 9/1987 | Goudie | 381/51 |

OTHER PUBLICATIONS

Lamel et al., "An Improved Endpoint Detector for Isolated Word Recognition", IEEE Trans. on ASSP, vol. ASSP-29, No. 4, Aug. 1981.

1985 IEEE, pp. 842–845, "Speaker Independent Telephone Speech Recognition", Hiroshi Iizuka.

*Primary Examiner*—Dale M. Shaw
*Assistant Examiner*—David D. Knepper
*Attorney, Agent, or Firm*—Spencer & Frank

[57] ABSTRACT

In a speech recognition system which performs a frequency analysis of speech input and determines its spoken interval, a time-normalized pattern (matching pattern) is prepared for use in similarity calculations. In the time-normalization, the time axis is segmented in such a manner as to cancel the effects of differences in the length of syllables in the input speech. With such normalization, it is possible to achieve high performance in linear matching of the input speech pattern against reference patterns using simple processing and a small memory space even when there are variations in the speaking rate.

16 Claims, 10 Drawing Sheets

SPEECH RECOGNITION SYSTEM IN WHICH VOICED INTERVALS ARE BROKEN INTO SEGMENTS THAT MAY HAVE UNEQUAL DURATIONS

This application is a continuation of application Ser. No. 07/084,108, filed Aug. 11, 1987, now abandoned.

BACKGROUND OF THE INVENTION

This invention relates to a speech recognition system, more particularly to a speech recognition system and employing a pattern matching technology.

Pattern matching is a standard method of speech recognition. In pattern matching, an input speech segment is analyzed from its startpoint to its endpoint at fixed intervals called frames to extract the features of each frame. A common example of such analysis is bandpass filter analysis using a bank of filters with differing center frequencies, which analyze the input signal into numbered channels. The result is a speech pattern—a time series of feature vectors—which can be compared with a set of reference patterns belonging to the categories of speech the system recognizes. Each category has one or more reference patterns considered typical of it. The similarity is calculated between the input speech pattern and each reference pattern, and the name of the category to which the most closely-matching reference pattern belongs is the result of the recognition process.

The following are two examples of pattern matching algorithms.

The first example is called the linear matching algorithm. As described in Oki Kenkyu Kaihatsu No. 118, Vol. 49, pp. 53–58, the input speech pattern is first subjected to linear expansion or compression on the time axis to absorb differences in the speaking rate; then it is matched against the reference patterns.

The second example is a nonlinear matching algorithm known as the DP matching algorithm. As set forth in Japanese Patent Application Publication No. 23941/1975, it uses dynamic programming to align the input speech pattern with the reference patterns by a nonlinear "warping" of the time axis, thereby obtaining optimal compensation for distortion resulting from factors such as variations in speaking rate.

Thus pattern matching algorithms are methods that evaluate, in terms of similarity, the difference between an input speech pattern and reference patterns (that were generated in the same way as the input pattern), and select the category to which the most similar reference pattern belongs. The underlying assumption is that if the input pattern and a reference pattern belong to the same category, they will have a high similarity, while if they belong to different categories, they will show a lower similarity.

Due to factors such as individual speaker differences and differences in environmental conditions, however, many types of variations in speaking rate occur, with the result being that two patterns belonging to the same category do not necessarily score high in similarity. Also, when the speaking rate varies, vowels tend to shrink or expand by large amounts, while consonants do not, so that linear expansion or compression of the time axis does not work very well in matching an input speech pattern with reference patterns. Specifically, the vowels in the input pattern fail to align with the vowels in the reference pattern, lowering the similarity score.

To cope with such variations, in the linear matching algorithm given above as the first example of the prior art, multiple reference patterns are provided for each category. This creates a problem of memory space, however, because each of the many reference patterns must be stored.

The DP algorithm, which was the second example of the prior art given above, is considered to be one solution to the problem of multiple reference patterns in the linear matching algorithm. This algorithm gets by with a small number of reference patterns by using the dynamic programming method to perform nonlinear speech expansion and compression, but the process of determining the optimal alignment between the input pattern and the reference patterns is complex and requires a large amount of circuitry, leading to problems of device size.

SUMMARY OF THE INVENTION

An object of this invention is to solve the problems in the prior art cited above: the problem in the linear algorithm of requiring a large memory space to store the many reference patterns needed to cope with variations in speaking rate; and the problem in the DP matching algorithm of the extensive circuitry required by the complexity of the process for performing nonlinear expansion and compression.

To provide a speech recognition system that uses simple processing and a small memory space but has good recognition capabilities, this invention uses a technique of nonlinear segmentation or division of the time axis by comparing cumulative distance scores of adjacent frames, and a linear matching algorithm that requires only a small number of reference patterns.

To achieve the above objectives, this invention performs a frequency analysis on the speech input, determines its spoken interval, and has means for performing the following processes on the pattern within this spoken interval:

(1) Means for determining, from factors such as variations in acoustic power, the number of syllables or high-power periods between the startpoint and endpoint frames, and finding the starting and ending frame numbers of each syllable.

(2) Means for splitting or dividing the time axis into an approximately equal number of segments or divisions within each syllable, with the space between each pair of syllables (from the endpoint frame of one syllable to the startpoint frame of the next syllable) comprising one segment or division.

(3) Means for calculating, for each of the frames from the startpoint frame to the endpoint frame of the speech input, a frame distance score (spectral score) measuring the distance between each frame and a preceding frame. In this process it is preferable that frequency components in which the difference between adjacent frames is small not be counted in the distance score, and that an operation be performed to reduce the distance scores of frames with low acoustic power.

(4) Means for calculating a cumulative distance score from the startpoint frame up to each of the frames from the startpoint frame to the endpoint frame.

(5) Means for subtracting the cumulative distance score of the starting frame of each syllable from the cumulative distance score of the ending frame of that syllable, evenly partitioning the resulting difference into a number of portions equal to the number of segments or divisions found for that syllable by means (2), and adding these portions to the cumulative distance score of the starting frame of the syllable to determine a set of boundary thresholds for division of that syllable.

(6) Means for performing a nonlinear segmentation or division of the speech pattern of each syllable by proceeding from its starting frame in the forward direction on the time axis and starting a new segment or division at the frame at which the cumulative distance score first exceeds each boundary threshold.

(7) Means for outputting, as a speech pattern, representative spectra of a time-normalized pattern within the interval from the starting frame to the ending frame in each segment or division.

Time-normalization denotes that the time axis is divided in such a manner as to cancel the effects of differences in the length of syllables in the input speech. With such normalization, it is possible to achieve high performance in linear matching of the input speech pattern against the reference patterns.

DESCRIPTION OF THE PREFERRED EMBODIMENTS

An embodiment of the speech recognition system of this invention will now be explained with reference to the drawings.

Figure 1:
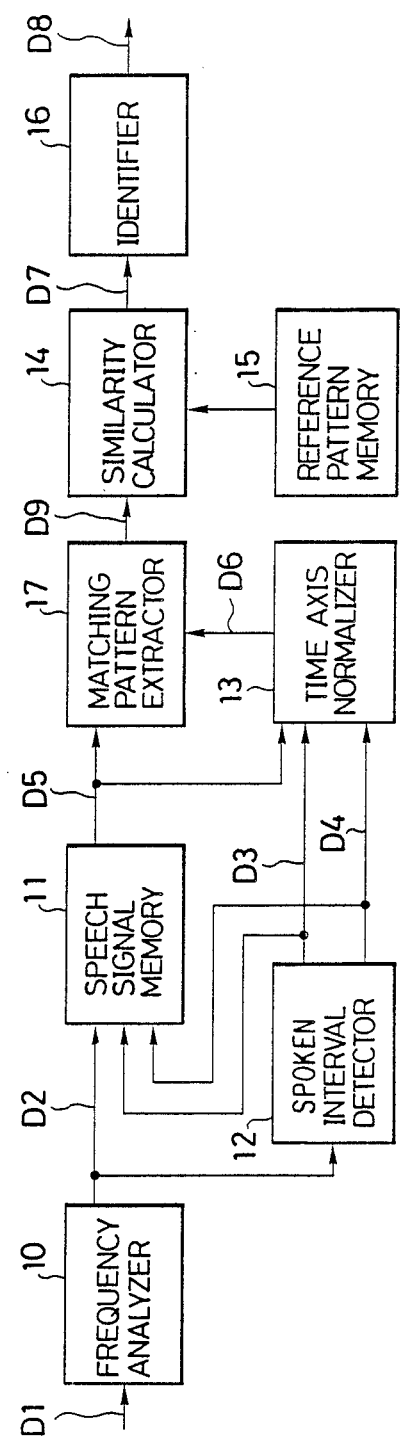
FIG. 1 is a block diagram of an embodiment of the speech recognition device of this invention.
Figure 2:
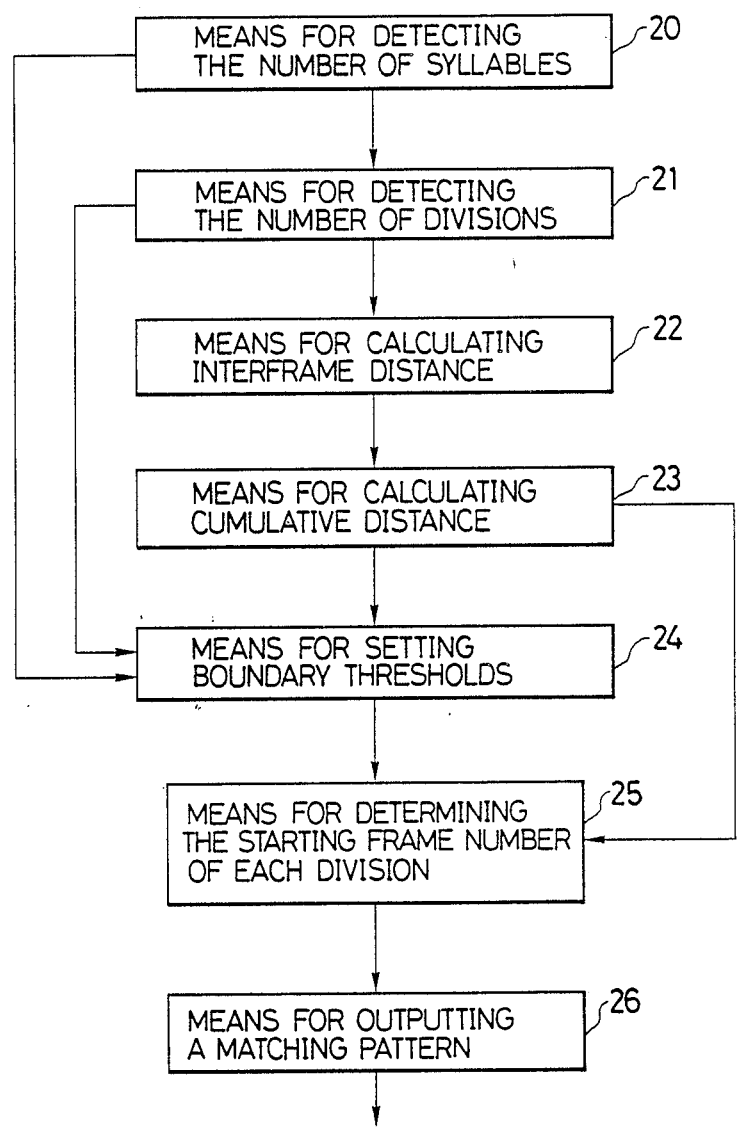
FIG. 2 is a functional block diagram showing the operation of the process for normalizing the time axis, which is a main element of this invention.
Figure 3A:
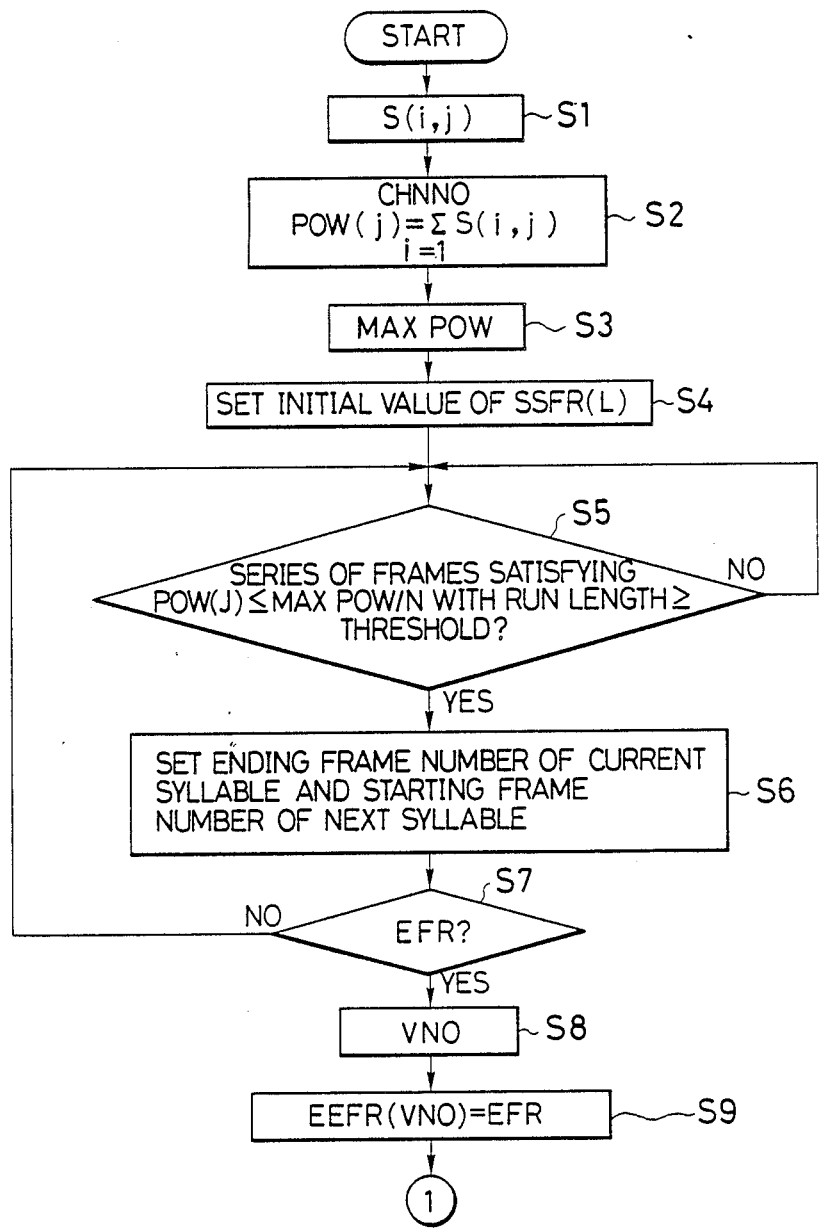
FIGS. 3A to 3G are flowcharts of the time-axis normalization process.
Figure 3B:
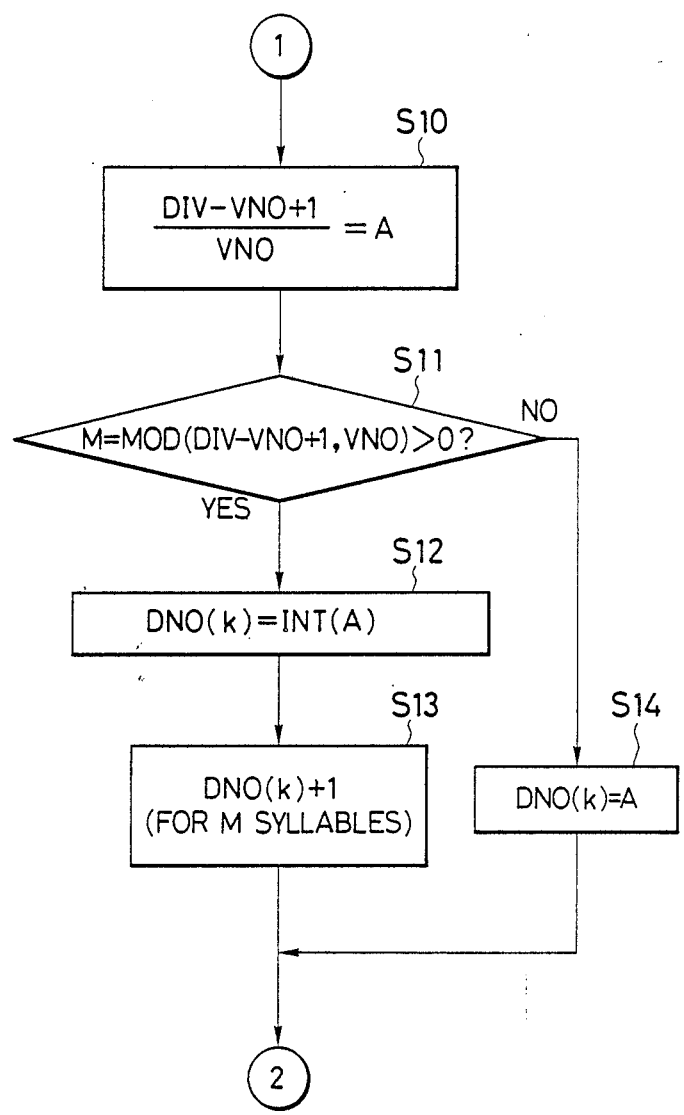
Figure 3C:
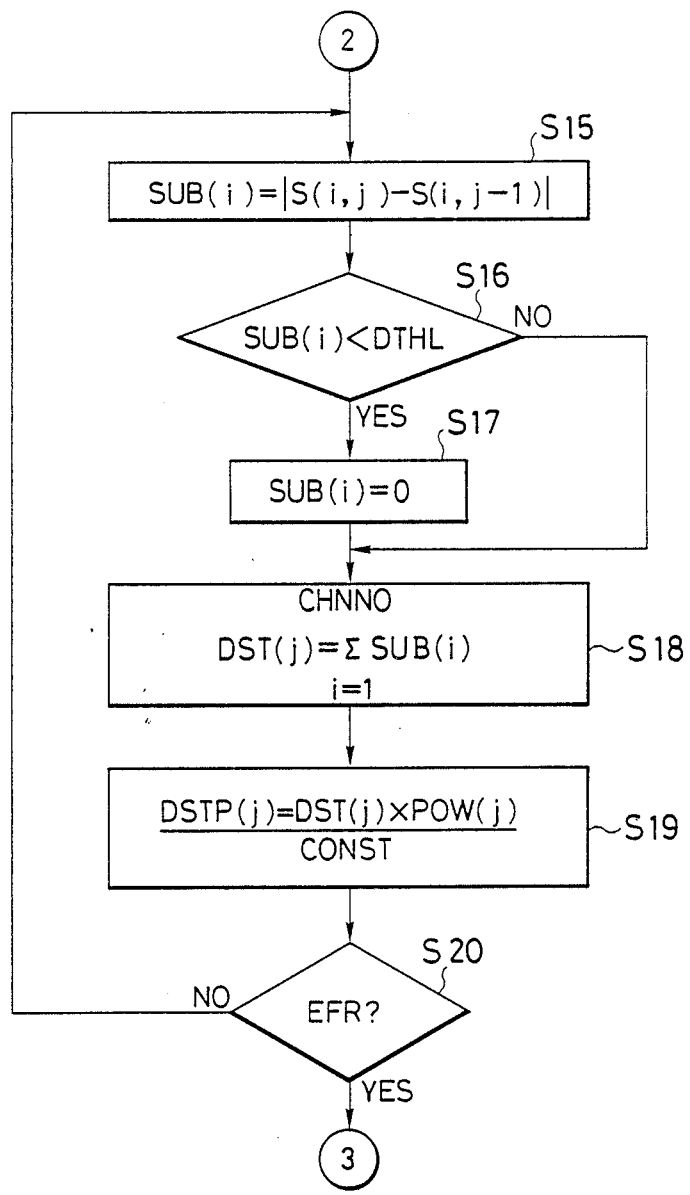
Figure 3D:
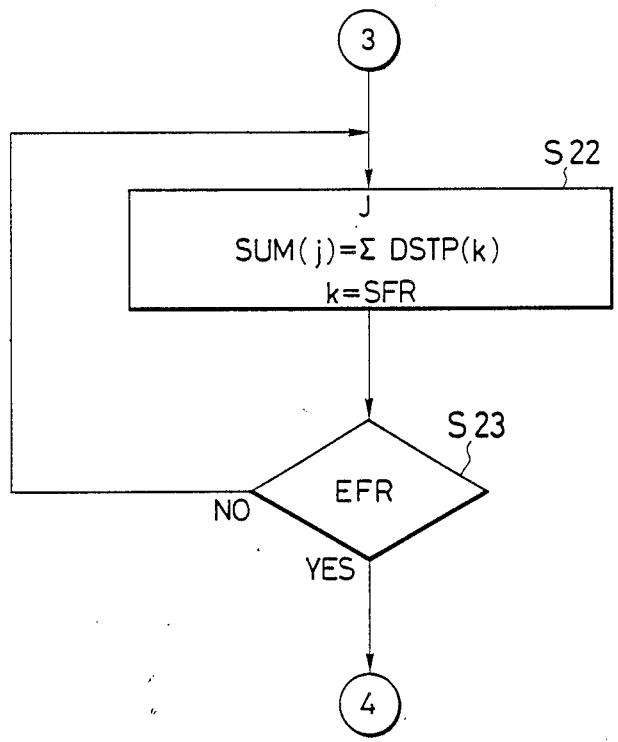
Figure 3E:
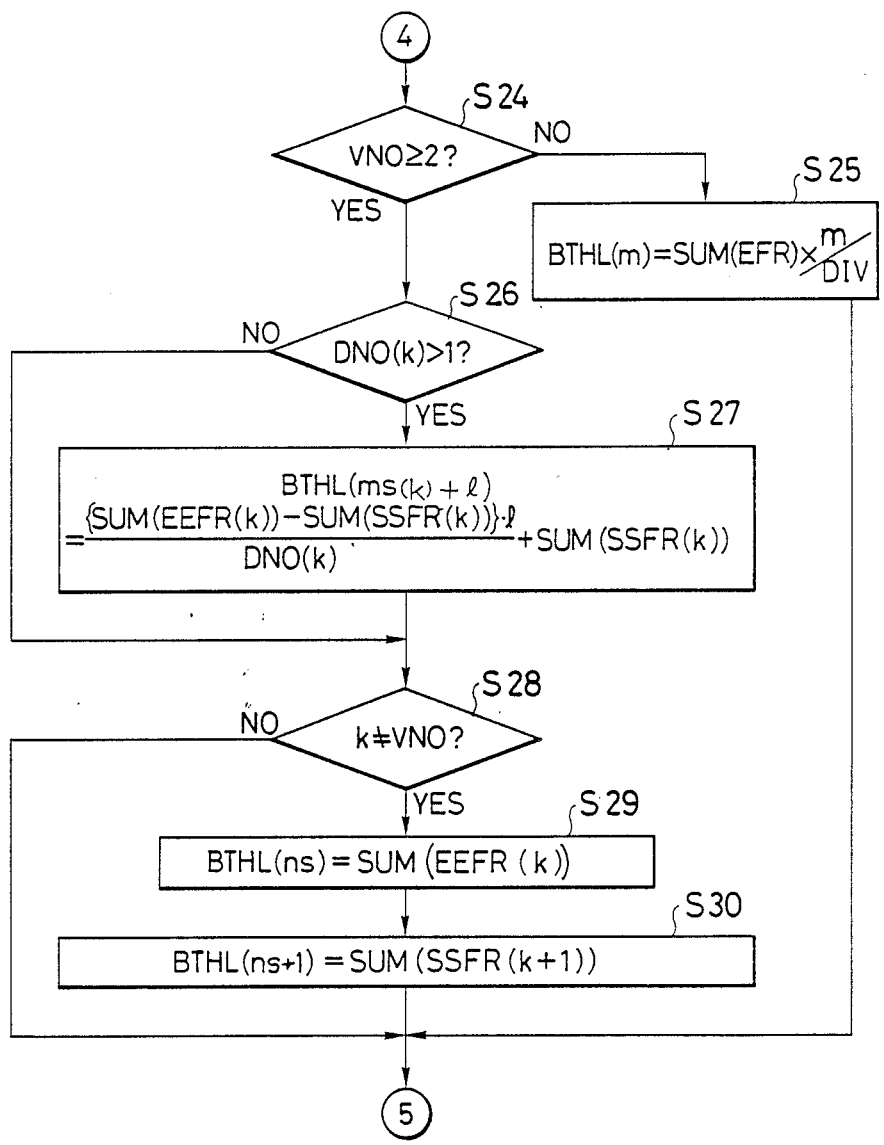
Figure 3F:
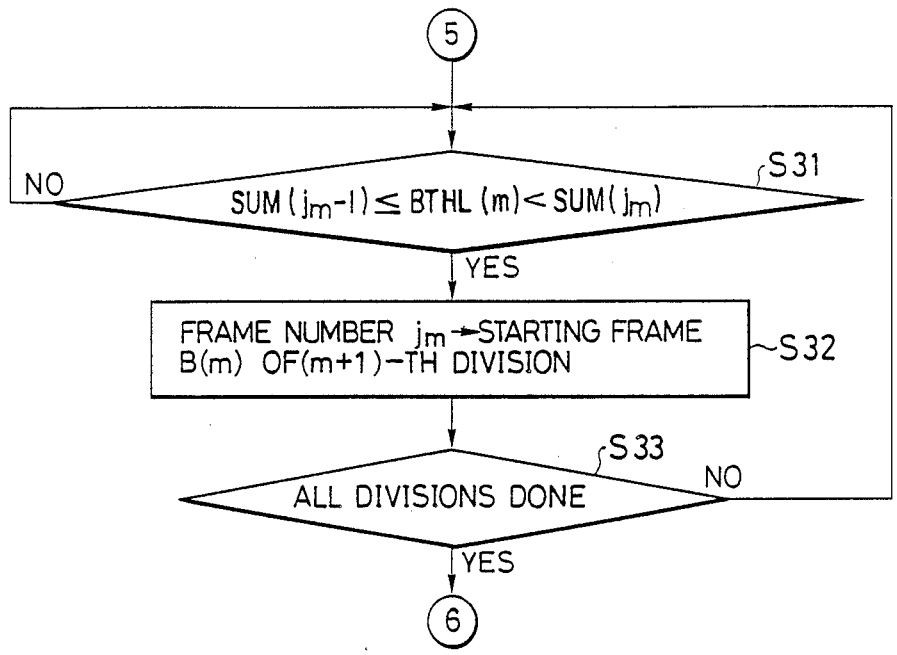
Figure 3G:
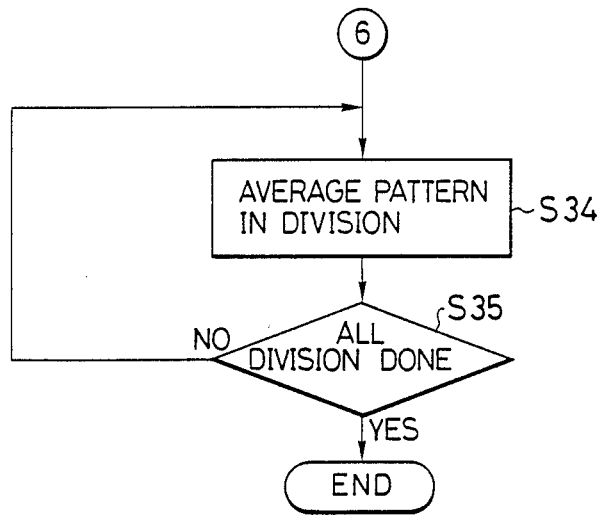

FIG. 1 is a block diagram of an embodiment of the speech recognition system of this invention. FIG. 2 is a diagram of the functional blocks of the means for subdividing the speech pattern on the time axis. FIGS. 3A to 3G are flowcharts of the segmentation or division process. The procedures in these flowcharts are shown by way of example, and they are not intended to limit the scope of the invention; the processing of the invention can be performed by other means as well.

The input signal D1 is first fed to a frequency analyzer 10 which calculates the frequency spectrum D2 at fixed intervals (frames) on the time axis. The frequency spectrum is found by analysis by a bank of bandpass filters providing a certain number of passbands, and is output to a speech signal memory 11 and a voiced or spoken interval detector 12.

From the magnitude of the frequency spectra, the spoken interval detector 12 determines the startpoint and endpoint times of the input speech segment (spoken interval). The startpoint time signal D3 and endpoint time signal D4 are output to the speech signal memory 11 and, in this embodiment of the invention, to a time-axis normalizer 13.

The speech signal memory 11 stores the frequency spectra for the spoken interval from the startpoint to the endpoint. At a certain timing, the frequency spectra D5 are sent to the time-axis normalizer 13 and the matching pattern extractor 17.

In this embodiment of the invention, the time-axis normalizer 13 calculates a time-normalized signal D6 by the procedure shown in FIG. 2 (explained later), and sends this time-normalized signal D6 to the matching pattern extractor 17.

The matching pattern extractor 17 receives the time-normalized signal D6 and the frequency spectrum D5 and extracts from the frequency spectrum D5 a matching pattern D9 which is output to the similarity calculator 14.

The similarity calculator 14 uses linear matching to calculate similarities between the matching pattern D9 and all of a set of reference patterns stored in a reference pattern memory 15. (The scale by which similarity is calculated can be a metric scale such as the city-block metric or Euclidean metric.) A signal D7 indicating the similarity with respect to each category of recognition is then sent to an identifier 16.

The identifier 16 selects from all the recognition categories the one giving the highest similarity and outputs it as the result D8.

The structure and functions of the frequency analyzer 10, speech signal memory 11, spoken interval detector 12, similarity calculator 14, reference pattern memory 15, and identifier 16 in the speech recognition system described above are identical or analogous to those of the corresponding parts of speech recognition systems that have been proposed previously, so detailed descriptions will not be given here.

A detailed description will, however, be given of the time-axis normalizer 13 and the matching pattern extractor 17, which are principal elements of this invention. The description will follow the block diagram in FIG. 2 and the flowcharts in FIGS. 3A through 3G. Steps in the process will be indicated by the letter S.

[1] Means for detecting the number of syllables (block 20 in FIG. 2)

The purpose of this means is to detect, from variations in the acoustic power, the number of high-power periods syllables in a spoken interval, and determine the starting and ending frames of each syllable.

Let SFR be the startpoint frame number of the spoken interval, EFR be the endpoint frame number, and CHNNO be a channel number in the frequency analysis. The first step (S1) is to find the frequency spectrum intensities $S(i, j)$ in the spoken interval where i is the channel number and j is the frame number. The next step (S2) is to calculate the acoustic power $POW(j)$ from the equation:

$$POW(j) = \sum_{i=1}^{CHNNO} S(i, j)$$

Next (S3) the maximum power MAXPOW in the spoken interval is found. Let SSFR (K) be the starting frame number of the K-the syllable and EEFR (K) be the ending frame number of this syllable. After initially setting $$SSFR(1) = SFR$$

in step 4 (S4), the algorithm searches from the startpoint frame SFR in the forward direction along the time axis (S5) looking for consecutive series of frames satisfying $$POW(j) \leq MAXPOW/N$$

(where N is a positive integer (e.g.,4) determined from experience). When it finds such a consecutive series with a run length (number of frames) equal to or greater than a threshold value, it assigns the starting frame number of that series minus 1 as the ending frame number of the current syllable EEFR(K), and the ending frame number of that series plus 1 as the starting frame number of the next syllable SSFR(K+1). If the run length is below the threshold the algorithm repeats step S5.

If at the end of the above process the endpoint frame EFR has not been reached, steps S5 and S6 are repeated until the endpoint frame is reached.

When the process reaches the endpoint frame, the number of syllables detected VNO is determined (S8), then the following assignment is made (S9):

EEFR(VNO)=EFR (VNO: number of syllables detected). This completes the process performed by this means.

[2] Means for determining the number of segments or divisions (block 21 in FIG. 2)

The purpose of this means is to determine the number of segments or divisions into which each syllable interval (from the starting frame of the syllable SSFR(K) to the ending frame of the syllable EEFR(K) will be split or divided, and do so in such a way that all syllables have approximately the same number of segments or divisions.

Let the total number of segments or divisions be DIV (for example, 8; this number is decided in advance). This process then determines the number of segments or divisions DNO(k) in each syllable interval detected (where k is the syllable number) as follows. First (S10) it calculates:

(DIV−VNO+1)/VNO=A

Next (S11) it tests the value:

M=MOD(DIV−VNO+1,VNO)

(where MOD(B, C) means the remainder when B is divided by (C),
If M>0, next (S12) the following assignments are made:

DNO(k)=INT(A)(k=1 to VNO)

(where INT(A) is the integer part of (A),
Next (S13) 1 is added to DNO(k) for each of the M syllables in turn containing a greater number of frames (from the startpoint frame of the syllable to its endpoint frame) than others. With this process, the remaining segments or divisions are distributed to the syllables having the greater number of frames.

For example, if DIV=8 and VNO=2, then:

$$\begin{cases} DNO(1) = 4 \\ DNO(2) = 3 \end{cases} [\text{if } EEFR(1) - SSFR(1) \geq EEFR(2) - SSFR(2)]$$

$$\begin{cases} DNO(1) = 3 \\ DNO(2) = 4 \end{cases} [\text{if } EEFR(2) - SSFR(2) > EEFR(1) - SSFR(1)]$$

When M=0 the above process of distributing the remainder is skipped and DNO(k)=A for all syllables (S14).

[3] Means for calculating interframe distance scores (block 22 in FIG. 2)

The purpose of this means is to calculate the distance between the speech pattern of a frame in the spoken interval and the speech pattern in the preceding frame, taking acoustic power into account. This distance is called the interframe distance score (or spectral distance, or intervector distance).

First, the interframe distance DST(j) of a frame (frame No. j) in the spoken interval is defined without taking account of acoustic power by equation (1):

$$DST(j) = \sum_{i=1}^{CHNNO} SUB(i) \qquad (1)$$

$$SUB(i) = |S(i, j) - S(i, j - 1)|$$

with the condition that if SUB(i)<DTHL, then:

$$SUB(i)=0 \qquad (2)$$

SUB(i) is the frequency spectrum intensity difference between the two successive frames, and DTHL is a threshold limit. The value of DTHL can be derived from experience.

The first step (S15) is therefore to determine SUB(i), then (S16) test whether SUB(i)<DTHL, and if so (S17) set SUB(i)=0, while if not retain the value calculated in step 15 as the value of SUB(i). These results are next used (S18) to calculate DST(j).

Modification of the distance DST(j) defined by equation (1) by the condition of equation (2) reduces the relative distance within regions of small spectral variation, such as the steady-state regions of vowels.

This distance DST(j) is then weighted by the acoustic power POW(j) to derive the interframe distance DSTP(j).

DSTP(j) is defined by equation (3):

$$DSTP(j) = DST(j) \times POW(j)/CONST \qquad (3)$$
where $$POW(j) = \sum_{i=1}^{CHNNO} S(i, j)$$

CONST: positive constant

The calculation in equation (3) is performed in step S19 to find DSTP(j).

Power-weighting as above has the effects of reducing the relative distance scores in silent portions in the spoken interval (such as the interval immediately preceding an explosive consonant, in which the level of the speech pattern is the same as when there is no speech, and no spectrum indicating features of the speech signal is output).

The processes performed in equations (2) and (3) increase the relative distance scores for consonants with little variation in the speaking rate and for non-steady-state portions.

The processes above are repeated for all frames from the startpoint frame SFR to the endpoint frame EFR (S20).

[4] Means for calculating cumulative distance (block 23 in FIG. 2)

The purpose of this means is to calculate, for each frame from the startpoint frame to the endpoint frame, a cumulative distance score by adding the distances as derived above for the frames from the startpoint frame to the frame under consideration.

The cumulative distance score SUM(j) for all the frames up to frame No. j is calculated from the interframe distances DSTP(k) as follows (S22):

$$SUM(j) = \sum_{k=SFR}^{j} DSTP(k) \quad (4)$$

The calculation in equation (4) is carried out on all frames from SFR to EFR in succession (S23).

[5] Means for setting boundary thresholds (block 24 in FIG. 2)

The purpose of this means is to calculate from the cumulative distance scores obtained as above, for each high-power period or syllable detected, a set of boundary threshold values for splitting the syllable into the number of segments or divisions found by means [2].

The cumulative distance SUM(j) calculated by means [4] above is used to determine the boundary threshold values BTHL(m) for selecting the frames at which to subdivide the syllable. The boundary threshold value BTHL(m) is defined as follows.

First (S24) it is determined whether the number of syllables VNO detected by the means for detecting the number of syllables 20 is 1, or is equal to or greater than 2.

(1) When the number of syllables detected (VNO) is 1, the following calculation is performed (S25):

$$BTHL(m) = SUM(EFR) \times m/DIV \quad (5)$$

where EFR is the endpoint frame number and m varies from 1 to (DIV−1).

(2) When the number of syllables detected (VNO) is 2 or greater, the following process is performed, where k is the syllable number:

(a) The truth of DNO(k)>1 is tested (S26), and the process described next is performed only on syllables for which DNO(k)>1 (S27):

$$BTHL(ms(k) + l) = \left[\frac{\{SUM(EEFR(k)) - SUM(SSFR(k))\} \cdot l}{DNO(k)}\right] + SUM(SSFR(k))$$

where l varies from 1 to DNO(k)−1 ms(1)=0 (if k=1)

$$ms(k) = \sum_{s=1}^{k-1} DNO(s) + k - 1 (\text{if } k \neq 1)$$

(b) Next k is compared with VNO (S28) and the process described below is performed only when k≠VNO.

First the value $$BTHL(ns) = SUM(EEFR(k))$$

is calculated (S29), then the value $$BTHL(ns+1) = SUM(SSFR(k+1))$$

is calculated (S30), where $$ns = \sum_{S=1}^{k} DNO(S) - k - 1$$

[6] Means for determining the startpoint frame number of each segment of division (block 25 in FIG. 2)

The purpose of this means is to make a nonlinear segmentation of the time axis by proceeding in the forward direction from the startpoint frame and selecting as the starting frame of each division the frame at which the cumulative distance score first exceeds the boundary threshold value for that segment.

From the cumulative distance scores SUM(j) and boundary threshold values BTHL(m) found by process blocks 23 and 24, a frame number $j_m$ is determined (S31) satisfying the condition:

$$SUM(j_m-1) \leq BTHL(m) \leq SUM(j_m)$$

This frame number $j_m$ is assigned (S32) as the starting frame number B(m) of the (m+1)-th segment or division. This process is repeated for the total number of segment or divisions (S33) to complete the nonlinear segmentation of the time axis into a given number of segment or divisions.

[7] Means for output of the matching pattern (block 26 in FIG. 2)

The purpose of this means is to output the matching pattern for the interval from the starting frame to the ending frame of each segment or division. In this embodiment, this is accomplished for example by determining the average patterns for all the segment or divisions (S34, S35).

The operation of the matching pattern extractor 17 will now be described. The signal D5 from the speech signal memory 11 can be expressed as F(i,j), where i(i=1 to CHNNO) is the channel number, CHNNO is the total number of channels, and j(j=SFR to EFR) is the frame number. The division boundaries along the time axis according to the above method is at B(m) (m=1 to (DIV−1)), and B(O)=SFR, and B(DIV)=EFR+1.

The frequency axis is similarlty split into CDIV regions. The channel numbers C(m') (m'=1 to (CDIV−1)) of the channels at the boundaries of the regions along the frequency axis are determined by the following equation:

$$C(m') = \left[\frac{CH \, m'}{CDIV}\right]$$

$$m' = 1 \text{ to } CDIV - 1$$

Here, square brakets [] indicate Gaussian symbols.

Moreover, the following assignments are made.

$$C(CDIV) = CHNNO + 1$$

$$C(O) = 1$$

C(m') gives the starting channel number of the (m'+1)−th channel region. The division of the time axis into DIV segments and the division of the frequency axis into CDIV regions will divide F(i,j) into DIV×CDIV regions. The matching pattern MP(m,m') in the divided region is given by:

$$MP(m, m') = \frac{\sum_{j=B(m-1)}^{B(m)-1} \sum_{i=C(m'-1)}^{C(m')-1} F(i, j)}{\{B(m) - B(m - 1)\}\{C(m') - C(m' - 1)\}}$$

$$m = 1 \text{ to } DIV, \, m' = 1 \text{ to } CDIV$$

The result is the average pattern of F(i,j) for each region.

Alternatively, the matching pattern can be a pattern having parts of the maximum power in the regions. In this case, $$MP'(m, m') = \frac{\sum_{i=C(m'-1)}^{C(m')-1} F(i, j)}{C(m') - C(m' - 1)}$$

Here, j' is given by:

$$j' = \arg\max_{j = B(m-1) \text{ to } B(m)-1} P(j)$$

That is, j' is the frame number of the frame giving the maximum power P(j) of the speech signal from the region B(m−1) to B(m)−1.

A further alternative of forming a matching pattern is to extract F(i,j) at the center of each region. In this case, the matching pattern MP" (m,m') is given by:

$$MP''(m, m') = F(i'', j'')$$

$$j'' = \left[ \frac{B(m) - B(m - 1) + 1}{2} \right]$$

$$i'' = \left[ \frac{C(m') - C(m' - 1) + 1}{2} \right]$$

Here, the square brakets [] indicate Gaussian symbols.

Where more than one feature value is used for the similarity calculation, the various methods for extracting matching patterns described above can be applied to each of the feature values.

The performance of steps 20 through 35 in the successive execution of process blocks 20 through 26 completes the process of normalizing the time axis 9.

Next the matching pattern found in this way is sent to the similarity calculator 14 where, as explained above, the similarity between it and all provided reference patterns are calculated. A signal denoting these similarities is sent to the identifier 16, which as explained above selects from all the reference patterns the reference pattern with the highest similarity, and outputs its category as the result of the recognition process.

Figure 4A:
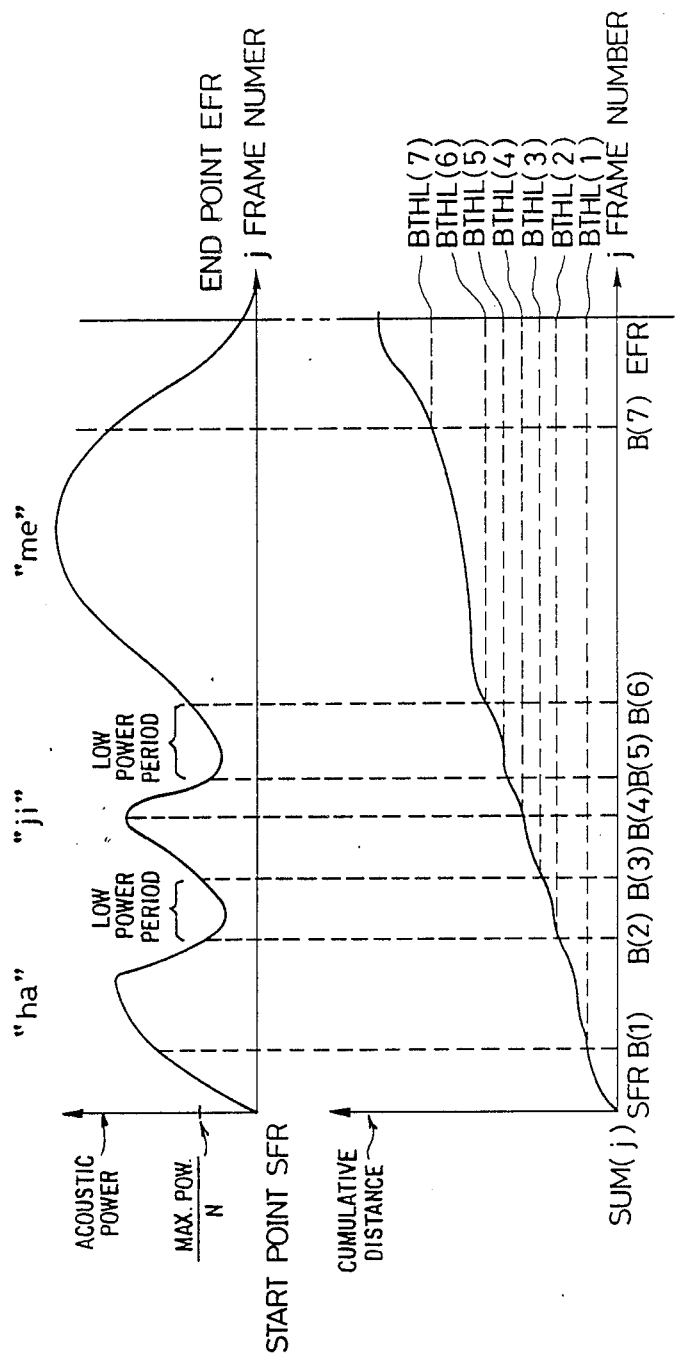
FIGS. 4A and 4B show the results of time-axis normalization as performed in this invention.
Figure 4B:
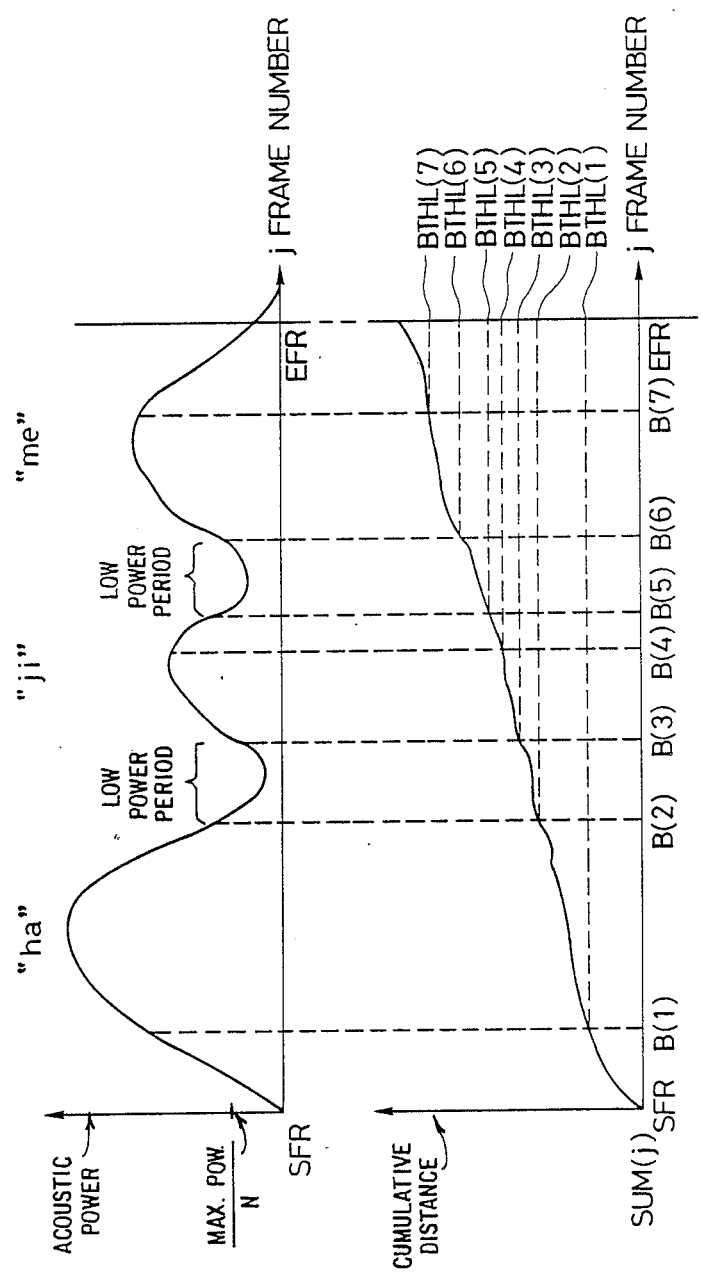

FIGS. 4A and 4B show how this system operates on two utterances of the Japanese word "hajime" with differing length relationships among the high-power periods or syllables "ha", "ji", and "me." The number of segments or divisions of the time axis is DIV=8. The frame number j is plotted on the horizontal axis in FIGS. 4A and 4B. The upper of each pair of diagrams indicates acoustic power on the vertical axis, while the lower of the pair indicates the cumulative distance score SUM(j). The boundary threshold values BTHL(m) (m=1, 2, ..., 7) are indicated on the right side of FIGS. 4A and 4B, and the starting frames B(m) (m=1, 2, ... , 7) of the segments resulting from these threshold values are indicated at the bottom of the diagram. As will be apparent from the lower portions of FIGS. 4A and 4B, the boundary threshold values split the change in the cumulative distance score during a spoken interval into cumulative distance score change intervals (i.e., the interval from BTHL(1) to BTHL(2), the interval from BTHL(2) to BTHL(3), and so forth).

In FIG. 4A the syllable "ha" is short and the syllable "me" is long, while in FIG. 4B "ha" is long and "me" is short. As can be seen from the diagrams, however, the different length relationships have no effect; the same segments or division numbers occur in the same syllables in both cases.

As is clear from the above description, this invention segments the time axis in a manner that is immune to the effect of differing syllable length in the input speech signal, enabling a high level of performance in speech recognition using a technique of linear matching with reference patterns.

What is claimed is:

1. A speech recognition system for recognizing speech by performing a frequency analysis on an input speech signal, detecting a spoken interval having a sequence of frames, then determining the similarity between the speech pattern in the detected spoken interval and a set of existing reference patterns by means of linear matching, and outputting as the result of the recognition process the name of the category containing the reference pattern with the highest similarity among all the reference patterns, wherein the system comprises:

first means for detecting the number of high-power periods in the spoken interval from the acoustic power of the input speech and determining the starting and ending frames of each high-power period;

second means for determining a number of segments into which each high-power period will be split, in the interval from the starting frame of a respective high-power period to the ending frame of the respective high-power period, so that approximately the same number of segments are allocated to each high-power period in the spoken interval when the spoken interval is split into a predetermined number of segments;

third means for calculating an interframe distance score representing a frequency spectrum intensity difference between the speech input of each frame and the speech input of a preceding frame, for each of the frames from the startpoint frame to the endpoint frame of the spoken interval;

fourth means for calculating a cumulative distance score for each of the frames by adding the interframe distance scores from the startpoint frame of the spoken interval to the frame under consideration;

fifth means for calculating boundary threshold values to split the change in the cumulative distance scores during the spoken interval into a predetermined total number of cummulative distance score change intervals which terminate at the threshold boundaries, the total number of cumulative distance score change intervals being equal to the number of segments into which the spoken interval is to be split, the fifth means calculating the boundary threshold values so that, for each high-power period, the difference between the cumulative distance scores at the starting frame and the ending frame of the respective high-power period is split into cumulative distance score change intervals which are equal in magnitude to one another and which are equal in number to the number of segments allocated to the respective high-power period by the second means;

sixth means for splitting the spoken interval into segments at frames where the cumulative distance score is substantially equal to the boundary threshold values;

seventh means for analyzing the input speech signal during each segment of the spoken interval and for outputting a matching pattern which consists of a time-series of feature values representing the analysis of the input speech signal for the respective segments; and eighth means for comparing the matching pattern with the reference patterns and determining the category containing the reference pattern with the highest similarity.

2. A speech recognition system according to claim 1, wherein said fifth means for calculating the boundary threshold values comprises means for performing the calculation in the following manner:

(a) when the number of high-power periods detected is equal to or less than 1, the cumulative distance score of the endpoint frame of the spoken interval is evenly partitioned into the predetermined total number of cumulative distance score change intervals, and the result is taken to be the boundary threshold values;

(b) when the number of high-power periods detected is 2 or greater, the cumulative distance score of the starting frame of each high-power period is added to the difference between the cumulative distance scores of the ending and starting frames of that high-power period divided by the number of segments allocated to that high-power period, and this result, as well as the cumulative distance scores of the ending frame of the high-power period and the starting frame of the next high-power period, are taken to be boundary threshold values, this process being repeated for each successive high-power period.

3. A speech recognition system according to claim 1, wherein the average spectrum in each segment is used as a feature value.

4. A speech recognition system according to claim 1, wherein the spectrum of the frame having the maximum acoustic power in each segment is used as a feature value.

5. A speech recognition system according to claim 1, wherein the spectrum of the center frame in each segment is used as a feature value.

6. A speech recognition system according to claim 1, wherein the first means comprises means for determining the acoustic power of the frequency-analyzed input speech for each frame, and for detecting any low-power periods between high-power periods, the high-power periods corresponding to syllables uttered during the spoken interval.

7. A speech recognition system for recognizing speech by performing a frequency analysis on an input speech signal having a sequence of frames and determining the similarity between the frequency-analyzed speech within a spoken interval and a set of reference patterns by means of linear matching, said speech recognition system comprising:

reference pattern memory means (15) for storing a set of reference patterns, each reference pattern being a time series of feature values which characterize segments of speech, each said reference pattern consisting of a predetermined number of said feature values;

frequency-analyzer means (10), receiving the input speech signal (D1), for calculating the frequency spectrum (D2) at each frame;

spoken interval detector means (12), receiving the frequency spectrum (D2) from the frequency-analyzer means (10), for determining the startpoint frame and the endpoint frame of the spoken interval and for producing a startpoint frame signal (D3) and an endpoint frame signal (D4) indicative of the startpoint frame and the endpoint frame;

speech signal memory means (11), receiving the frequency spectrum (D2) and the startpoint frame signal (D3) and the endpoint frame signal (D4), for storing the frequency spectra for the spoken interval from its startpoint frame to its endpoint frame;

first additional means (20), receiving the frequency spectra, for determining the acoustic power of the frequency-analyzed speech for each frame, for determining one or more high-power periods in which the acoustic power is relatively high and low-power periods in which the acoustic power is relatively low, and for detecting the number of the high-power periods within the spoken interval;

second additional means (21) for determining the number of segments into which each high-power period should be split so that the sum of the number of the low-power periods and the number of the segments in all the high-power periods is equal to said predetermined number of the feature values of each reference pattern, and so that all the high-power periods will have an approximately equal number of segments;

third additional means (22), receiving the frequency spectra for the respective frames from the speech signal memory means (11), for calculating interframe distances which represent differences in the frequency spectrum between successive frames;

fourth additional means (23), responsive to the interframe distance, for calculating a cumulative distance score for each frame, the cumulative distance score representing the summation of the interframe distances from the startpoint frame of the spoken interval to said each frame;

fifth additional means (24), receiving the number of segments for each high-power period and the cumulative distance score at the starting frame and the ending frame of each high-power period, for setting one or more boundary thresholds by splitting the difference between the cumulative distance scores at the starting and ending frames of each high-power period into intervals of equal magnitude;

sixth additional means (25), responsive to the boundary thresholds, for determining the boundaries between segments;

matching pattern extractor means (17), receiving the frequency-spectra (D5) from the speech signal memory means (11) and the boundaries between the segments, for producing a matching pattern consisting of feature values for the respective segments;

similarity calculator means (14), receiving the matching pattern (D9) from the matching pattern extractor means (17) and the reference patterns from the reference pattern memory means (15), for calculating similarities between the matching pattern (D9) and the reference patterns using linear matching and for producing a signal (D7) indicating the similarity of the matching pattern (D9) with respect to each reference pattern; and identifier means (16), receiving the signal (D7) from the similarity calculator means (14), for selecting from all the recognition categories the one giving the highest similarity and for outputting a signal (D8) indicating the result of the selection.

8. A system according to claim 7, wherein said first additional means (20) comprises means for receiving the frequency spectra, determining the acoustic power for each frame, determining the maximum power in the spoken interval, determining a threshold from the maximum power, detecting a series of consecutive frames satisfying the condition that the acoustic power is smaller than said threshold, recognizing one or more periods of such consecutive frames as said low-power periods, recognizing one or more periods other than the low-power periods as said high-power periods, recognizing a frame immediately preceding the first frame in each low-power period as the ending frame of the high-power period preceding the respective low-power period, recognizing a frame immediately following the last frame in each low-power period as the starting frame of the high-power period following the respective low-power period, and detecting the number of the high-power periods within the spoken interval.

9. A system according to claim 8, wherein said first additional means (20) comprises means for dividing the maximum power by a predetermined factor to determine the threshold.

10. A system according to claim 7, wherein said second additional means (21) for determining the number of segments into which each high-power period should be split comprises means for allocating a larger number of segments to high-power periods consisting of a greater number of frames if exact equality cannot be achieved in the allocation of the segments among the high-power periods.

11. A system according to claim 7, wherein said second additional means (21) comprises means for determining the number of segments so that each low-power period will have a single segment.

12. A system according to claim 7, wherein said third additional means (22) comprises means for weighting the interframe distances by the acoustic power for the successive frames.

13. A system according to claim 7, wherein:
said sixth additional means (25) comprises means for determining the starting frame of each segment; and said matching pattern extractor means (17) receives signals indicating the starting frames as the boundaries between the segments.

14. A system according to claim 7, wherein the average spectrum in each segment is used as said feature value of the respective segment.

15. A system according to claim 7, wherein the maximum acoustic power in each segment is used as said feature value of the respective segment.

16. A system according to claim 7, wherein the spectrum of the center frame in each segment is used as said feature value of the respective segment.

* * * * *